D. M. CAMERON.
ACID RESISTING STRAINER FOR SMELTERS.
APPLICATION FILED JUNE 25, 1915.
1,190,512. Patented July 11, 1916.
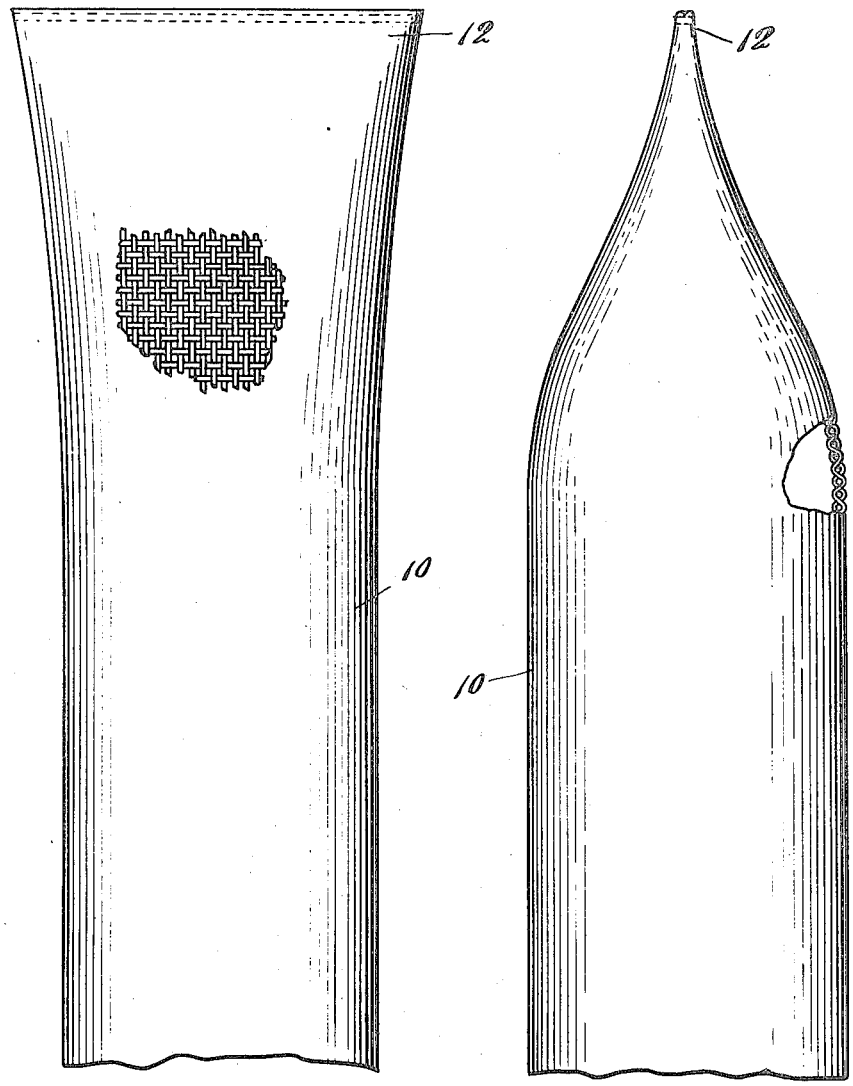

UNITED STATES PATENT OFFICE.

DONALD M. CAMERON, OF LOWELL, MASSACHUSETTS.

ACID-RESISTING STRAINER FOR SMELTERS.

1,190,512.           Specification of Letters Patent.     Patented July 11, 1916.

Application filed June 25, 1915. Serial No. 36,372.

*To all whom it may concern:*

Be it known that I, DONALD M. CAMERON, a citizen of the United States, residing at Lowell, in the county of Middlesex and State of Massachusetts, have invented an Improvement in Acid-Resisting Strainers for Smelters, of which the following is a specification.

In smelters it is very desirable to arrange a strainer in the stack to catch metallic particles which are associated with the fumes and smoke which pass up the flue. The fumes and smoke contain certain chemical constituents which have a very deleterious effect on the material composing the strainer which has usually been employed, so much so in fact that the production of an efficient strainer is a serious problem. A strainer for this use must be strong, have a fine mesh and otherwise adapting it to catch the particles; capable of withstanding a high degree of temperature; and above all must be acid-resisting to a high degree.

A strainer composed of wool has been tried, and while new well subserves the purpose, but in a very short period of time it becomes weakened by the action of the acid fumes, and separates into fragments. This is due to the scale-like formation which is characteristic of the structure of the wool hair, which causes the same to part on the lines indicated by the scale marks on the periphery thereof, these marks being the lines of greatest weakness, and also being the points which are subject to attack by the acid fumes. I have discovered that a strainer made of fiber or hair, which is devoid of such scale-like formation, and particularly the striations of which are longitudinal, such for instance as camels' hair, will solve the above difficulties, for the reason that there are no lines of weakness at right-angles to the long axis of the hair. Such a strainer is acid-resisting to a high degree; withstands a high temperature, is very strong and maintains its strength for a long period of time, because it is not subject to attack by the acid fumes at numerous points throughout its length.

The strainer will be of cylindrical formation, closed at its upper end, and preferably is devoid of any side seam. Such a strainer may be woven of yarns composed of camels' hair on a bag loom or circular loom, or knit on a circular knitting machine, the former means, however, being preferable on account of cheapness in the manufacture.

Figure 1, represents a front view, and Fig. 2, a side view of a strainer for smelters, embodying this invention.

10 represents the cylindrical seamless tubular body-portion, having its upper end 12 closed. It is composed of camels' hair formed into yarns, and the yarns woven into the desired form. It may be of any desired dimension, but is usually quite large for the purpose herein set forth. The strainer is adapted to be suspended in the flue of a smelter, and the fumes and smoke pass through it, and the metallic particles are caught and held by it. These particles may be removed at any time by shaking the strainer or otherwise.

I claim:

As an article of manufacture, an acid resisting strainer for smelters comprising a cylindrically-formed body closed at its upper end and composed of yarn, constructed of fiber, the striations of which are longitudinal and free of scale-like formation.

In testimony whereof, I have signed my name to this specification, in the presence of two subscribing witnesses.

DONALD M. CAMERON.

Witnesses:
    B. J. NOYES,
    H. B. DAVIS.